United States Patent [19]

Caparelli, Jr. et al.

[11] Patent Number: 4,809,456

[45] Date of Patent: Mar. 7, 1989

[54] FISH ACTIVATED SIGNALLING APPARATUS

[76] Inventors: Guy I. Caparelli, Jr., 5958 Misty Lake, San Antonio, Tex. 78222; Harry M. Jordan, Sr., 4741 Hardy Rd., San Antonio, Tex. 78264

[21] Appl. No.: 109,596

[22] Filed: Oct. 19, 1987

Related U.S. Application Data

[63] Continuation-in-part of Ser. No. 856,271, Apr. 28, 1986, abandoned.

[51] Int. Cl.⁴ ............................................. A01K 93/00
[52] U.S. Cl. ...................................................... 43/17
[58] Field of Search ........................... 43/17, 17.1, 17.5

[56] References Cited

U.S. PATENT DOCUMENTS

| | | | |
|---|---|---|---|
| 1,173,827 | 2/1916 | Marsh | 43/17 |
| 1,410,817 | 3/1922 | Lloyd | 43/17 |
| 2,110,596 | 3/1938 | Gaede | 43/17 |
| 2,153,750 | 4/1939 | Goertzen | 43/17 |
| 2,179,878 | 11/1939 | Dietrich | 43/17 |
| 2,331,665 | 10/1943 | Douglas | 43/17 |
| 2,476,633 | 7/1949 | Sohr | 43/17 |
| 2,490,669 | 12/1949 | Burke | 43/17 |
| 2,722,763 | 11/1955 | Miner | 43/17 |
| 2,798,330 | 7/1957 | Carraway | 43/17 |
| 3,382,598 | 5/1968 | Wilson | 43/17.1 |
| 3,739,513 | 6/1973 | Durham | 43/17 |

Primary Examiner—Kurt Rowan

[57] ABSTRACT

A signalling device for use in fishing to indicate when a fish has taken the bait. The signalling device consisting of an indicator such as a light or an alarm connected through a switch means to power source such as a battery. A fishing line is operatively connected to the switch to activate the signal when the line is tugged on by a fish.

5 Claims, 2 Drawing Sheets

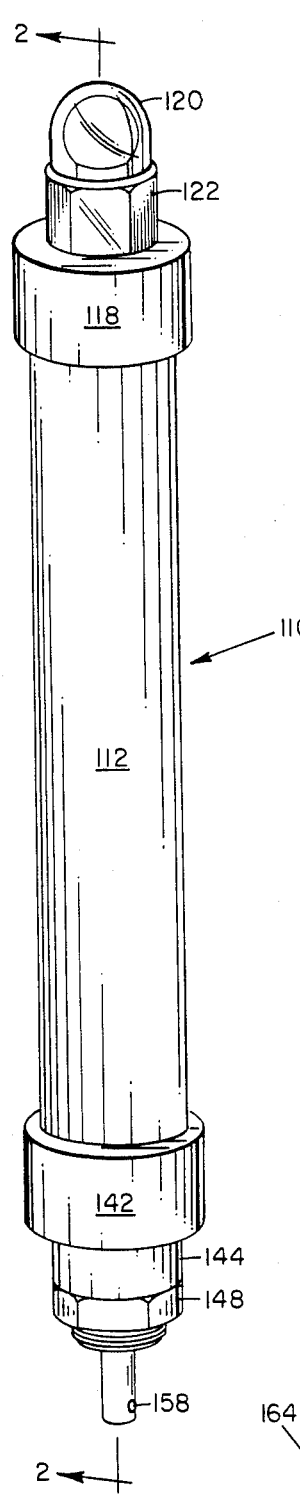
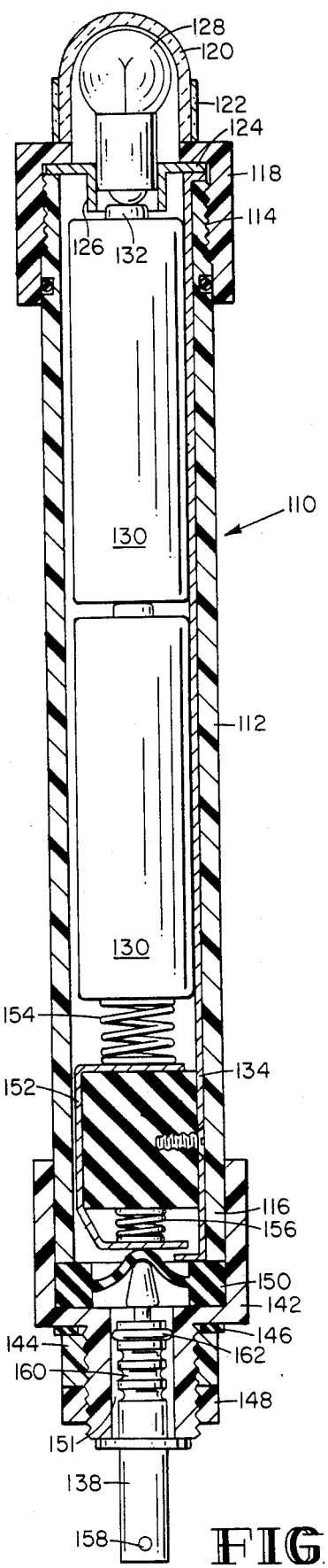
FIG. 3
FIG. 5
FIG. 4

FISH ACTIVATED SIGNALLING APPARATUS

This application is a continuation-in-part application of Application Ser. No. 856,271 filed Apr. 28, 1986 now abandoned.

BACKGROUND OF THE INVENTION

The present invention pertains to an apparatus for signalling a strike or a loss of bait caused by a fish while jug-fishing, float fishing, pier fishing, trot-line fishing, or trolling. In its presently preferred embodiment, the invention is used for jug-fishing at night.

Jug-fishing is a pleasurable pasttime and a productive activity engaged in by fishermen of all ages and in all parts of the country. Customarily, a fishing line with a sinker and one or more baited hooks is secured to a capped jug or bottle full of air. The air-filled vessel floats on the top of the water and performs several functions, one of which is that the jug or bottle is visible to the fisherman to mark the location of his line, sinker and baited fishing hooks.

A second function performed by the floating vessel is that its buoyant force operates to "set" a fishing hook in the mouth of a fish as the fish gulps the bait on the hook, pulling up on the hook as the fish pulls downward or sideways upon the baited hook. A very strong fish will sometimes pull a hook, line, sinker, and jug many hundreds of yards away from the initial location in which it was placed by the hopeful fisherman.

Numerous problems are encountered by fishermen who attempt jug-fishing at night. The fisherman must keep a constant watch on his various jugs in order to see where they are located and whether something may be caught on his various hooks. Sometimes, he must tediously pull up the lines to discover whether or not his hooks remain baited. Many jug-fishermen use spotlights for frequent searching to locate their errant jugs and lines. At night a jug or bottle dragged any considerable distance by a fish may remain lost to the fisherman who has no way of discovering its location other than that of searching with a spotlight. These various problems and disadvantages encountered while engaged in the traditional sport of jug-fishing may be overcome by providing a battery operated signal which can be inserted into a jug or bottle attached to a float, or attached to any object adjacent or extending over water, which can be activated by the tug or pull of a fish on a line connected to the signal.

It is an object of the present invention to provide a novel means for identifying jugs or bottles at night having attached lines with baited hooks which have sustained the strike of a fish.

It is another object of the present invention to provide a means for locating a jug or bottle which, when a fish has been caught upon an attached hook and line, has been displaced from its originally placed location.

Another object of the present invention is to provide a method for jug-fishing at night which is simple and easy to perform, requiring less effort and time than previously known methods for jug-fishing.

Another object of the present invention is to provide an apparatus which can be used with a bottle or jug having any size or neck configuration, for indicating the strike of a fish while jug-fishing at night.

A further object of the present invention is to provide an apparatus which will indicate to a user when it is necessary to re-bait a hook while jug-fishing at night.

Yet another object of the present invention is to provide a signalling apparatus which can be secured to a pier, post, marker, or a manufactured article such as a styrofoam float which is activated by the strike of a fish.

Another object of the present invention is to provide a signalling apparatus which can be secured to a trotline to indicate the strike of a fish or a loss of bait taken by a fish.

A further object of the present invention is to provide a signalling apparatus which can be used while trolling or surf-fishing, to indicate the strike of a fish or a loss of bait taken by a fish.

These and other objects and advantages will be apparent to those of ordinary skill in the art from the following disclosures.

SUMMARY OF THE INVENTION

These objects and advantages are accomplished by providing a signalling apparatus which may be secured in a jug which is readily available or fastened to a pier, post, marker or manufactured article such as a styrofoam float, and which can then be activated by a pull or tug on a fishing line which is operatively connected to the light apparatus. A pull or tug on the fishing line of such force as is ordinarily exerted by a fish having a weight of one or two pounds, when it has a hook secured in its mouth, completes an electric circuit and activates the signal.

BRIEF DESCRIPTION OF THE DRAWINGS

FIG. 3 is a perspective view of an alternate embodiment of the present invention.

FIG. 4 is a cutaway view of the apparatus of FIG. 3.

FIG. 5 is a perspective view of an alternate embodiment of a pull pin constructed according to the teachings of the present invention.

DETAILED DESCRIPTION OF THE DRAWINGS

Figure 1:
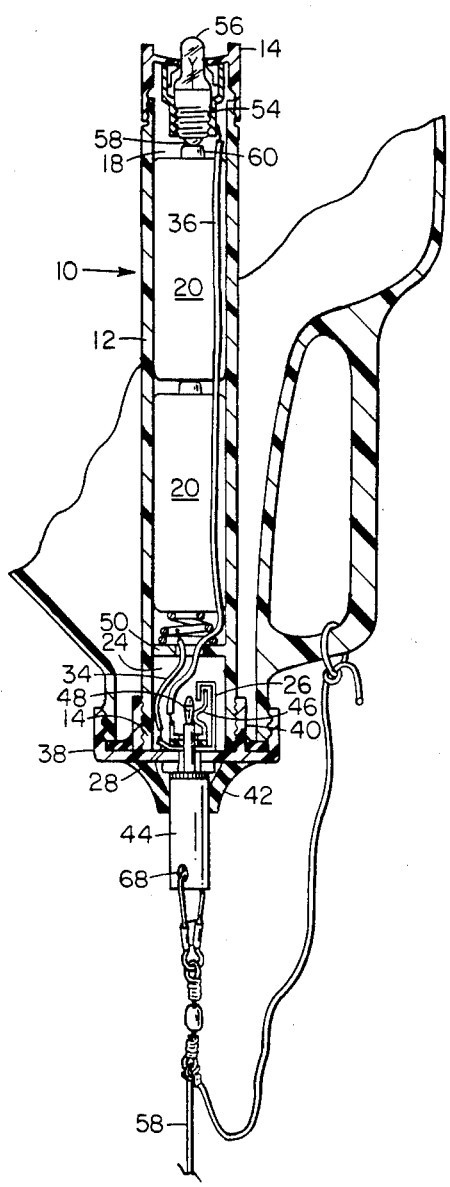
FIG. 1 is a cross-sectional view of the apparatus of the present invention as it would appear when in place within the neck of a bottle.
Figure 2:
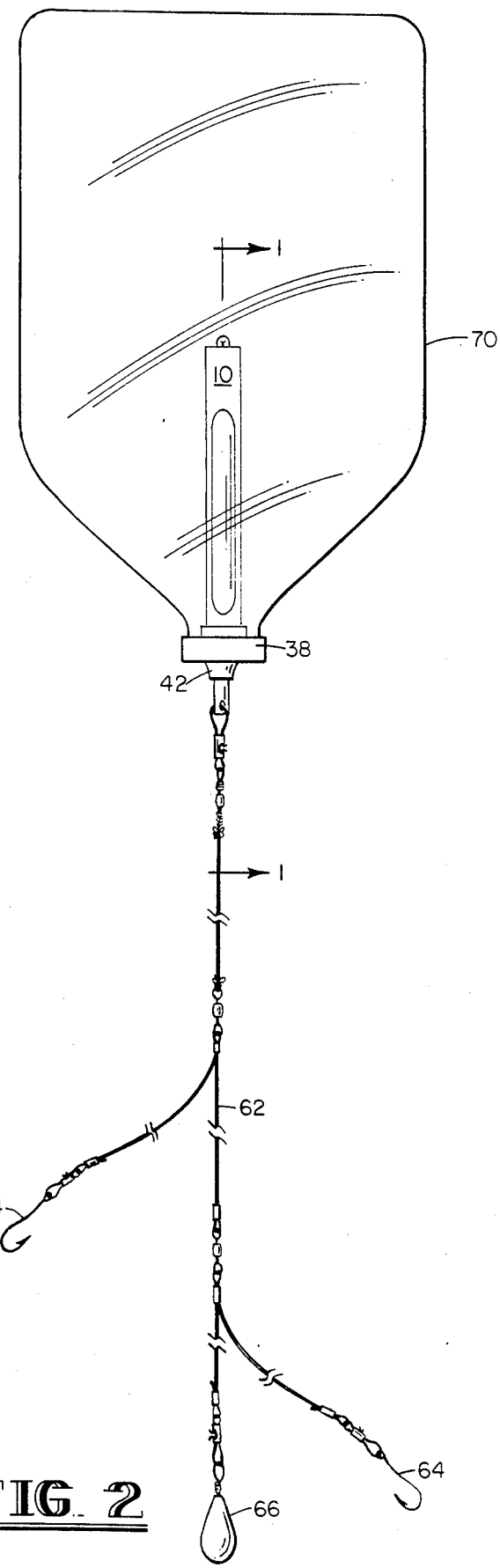
FIG. 2 is a perspective view of the apparatus of the present invention as it would appear when in use in a non-opaque bottle.

Referring to FIGS. 1 and 2, the apparatus of the present invention is designated generally at 10. Referring to FIG. 1, casing 12 is shown having a light bulb receiving end 14 and a plug receptor 16 contain within its cylindrical space 18 one or more primary or secondary dry-cell batteries 20 and coiled wire 22. In a presently preferred embodiment, the casing 12 is constructed of lightweight molded plastic such as ethyl cellulose or cellulose acetate butyrate. The coiled wire in a presently preferred embodiment is of high conductivity, such as copper wire or a copper alloy wire of gauge 18.

A second cylindrical space 24 is received within the plug receptor end 16 of casing 12. Baseplate 50 divides the two cylindrical spaces, 18 and 24, within casing 12. Shown centered in second cylindrical space 24 is a plug receptor unit 26. Plug receptor unit 26 has several components, including a plug-engaging ring 28 having a plurality of attachment sites 30 and 32 for integral attachment of insulated conducting wires 34 and 36. In a presently preferred embodiment, the plug receptor unit is constructed by securing an "Archer" phone jack within an appropriately sized round opening in a bottle or jug cap 38 of a preferred size or style.

A sleeve 40 is secured to cap 38 by integral attachment of plug receptor unit 26 together with sleeve 40 and cap 38. In a presently preferred embodiment casing 12 is secured to sleeve 40, forming enclosed cylindrical space 24. A rubber grommet 42 is adherently secured to the external aspect of bottle cap 38. Plug 44 is shown received within plug receptor unit 26, plug-engaging ring 28, sleeve 40, bottle cap 38, and rubber grommet 42. A plug-contacting extension of plug receptor unit 26 is shown in close juxtaposition to the male end 48 of plug 44.

Insulated wire 34 is secured by soldering at one end to coiled wire 22 and at the other end to attachment site 30 of plug-engaging ring 28 of plug receptor unit 26. Insulated wire 34 is threaded through a hole in base plate 50 sufficient in size to permit passage of insulated wire 34. Insulated wire 36 is secured at one end to attachment site 32 of plug-engaging ring 28 by soldering, and extends through base plate 50 adjacent to batteries 20 to a metallic clip connector 52, which is loosely secured around the ring contact area 54 of incandescent light bulb 56. Tip contact area 58 of incandescent light bulb 56 is shown in close juxtaposition to positive electrode 60 of dry cell battery 20.

Referring to FIG. 2, the apparatus of the present invention is shown as it might appear when being used for jug-fishing. In actual use, a plastic jug having a handle is preferred, although any type of bottle, jar or other air-containing vessel may be utilized. Fishing line 62, having one or more hooks 64 attached to said line in any desired manner or configuration, are pulled to a chosen depth by a sinker 66 attached to one end of fishing line 62. The other end of fishing line 62 is secured through a hole 68 in an end of plug 44, by any desired fastening means suitable for fishing. In a preferred embodiment of the present invention, plug 44 is an "Archer" phone plug, modified for use in the invention by drilling hole 64 through the base portion of plug 44.

Referring again to FIG. 1, it can be seen that when the male end 48 of plug 44 is received within plug-engaging ring 28, the circuit created by ring contact area 54, wire 36 and plug-engaging ring is essentially grounded by contact with the non-conductor plug 44. When plug 44 is removed from within plug receptor unit 26, the circuit from insulated wire 34 to coiled wire 22 to dry cell batteries 20, and thence to tip contact 58 of incandescent light bulb 56 from positive electrode 60 of dry cell battery 20, is completed, and the light is switched on. The plug 44 is pulled from the plug receptor unit 26 when a hook 64 is taken within the mouth of a fish and is fixed within the fish's mouth. The hook 64 becomes fixed in the fish's mouth in part due to the buoyant force exerted by air-filled bottle 70, within which the apparatus of the invention floats at the surface of the water. Incandescent light 56 can be seen at a distance of at least 500 yards, permitting easy visibility to a fisherman, and signalling when a bait has been taken or a fish caught upon a baited hook.

Although the preferred embodiment is disclosed as an electrically powered light bulb having batteries as the means for providing electrical energy to the light, the signalling means of the invention could be a bell, alarm, siren, or whistle, one or more. The invention can be powered by one or more alkaline batteries as is the preferred embodiment or by any other source of energy known to those skilled in the art, such as a solar cell. The switching means or means for completing the electrical circuit can be a plug and socket as is disclosed, or other switching means known to those skilled in the art.

The invention can be secured within a hollow floating container such as a jug, or it may be secured to a floating object such as a sytrofoam fishing float or buoy standardly available. The apparatus of the present invention can be secured to posts extending into the water, such as those supporting a pier, or can be secured at intervals along a trot line. It can be used while casting or trolling if desired and for this use the apparatus is attached by fishing line to a chosen fishing rod or pole, intermediate between the rod and the baited hooks.

Referring to FIGS. 3, 4, and 5, an alternate embodiment of the fish-activated signalling device of the present invention is disclosed, designated generally at 110. The fish-activated signalling device 110 is particularly designed to permit precise control of the amount of resistance required to activate the light signal, so that the fish-activated signalling device 110 can be used by commercial fishermen for catching only large fish, or by the sport fisherman for catching smaller fish as within a specific pound limit.

The fish-activated signal light 110 is comprised of a housing provided with a first threaded end 114 and a second non-threaded end 116, for receiving electrical connection and activation means therein. A cap member 118 is threadably received upon threaded end 114 of housing 112. Cap member 118 comprises a lens cover 120 which in a preferred embodiment is a prismatic lens cover, and a support ring 122 integral with cap member 118. Within cap member 118 are received a retainer member 124 and a lens O-ring 126 for rendering the cap member 118 and lens cover 120 around light bulb 128 effectively water-tight.

Batteries 130 are slidably disposed within housing 112, for electrical connection at end 132 of battery 130 to light bulb 128. Switch stem 134 is longitudinally received within housing 112 for permitting electrical connection of batteries 130 to light bulb 128 when pull pin 138 or pull pin 140 is forcibly removed from within base cap member 142.

Base cap member 142 is provided with a base nut 144, a washer 146, and a cap 148 threadably received thereon. Within base cap member 142 a diaphragm 150 is slidably disposed, which diaphragm prevents intrusion of water within the confines of housing 112. Diaphragm 150 is proportioned so that the seal by means of diaphragm 150 between outer pin chamber 151 and the interior of housing 112 is water-tight.

Also disposed within housing 112 are switch 152 adherent to coiled spring 154 at a first end and to switch spring 156 at a second end. When the pull pin 138 is removed from outer pin chamber 151 as by the pull of a fish on a line attached through line-attachment hole 158, switch spring 156 forces switch 152 against switch stem 134, thus completing the electrical connection of batteries 130 to light bulb 128.

Another feature of the signalling device 110 is a unique pull pin 138, which is generally cylindrical in shape and provided with concentric grooves 160 therein for holding a chosen number of O-rings 162 thereon. It can be understood that if more O-rings 162 are placed on concentric grooves 160, and such O-rings 162 are strongly but releasably adherent to pull-pin 138, greater numbers of O-rings will create greater frictional resistance within outer pin chamber 151. Thus, the amount of pull required to be exerted on pull-pin 138 will be greater when a greater number of O-rings 162 are supplied, and lesser when a lesser number of O-rings 162 are supplied. By selecting a number of O-rings 162 to be positioned in grooves 160, a fisherman can effectively select a size of fish which will be capable of activating the fish-activated signal light 110.

An alternate pull-pin 164 can be provided for activation of fish-activated signal light 110. Alternate pull-pin 161 is slidably received within outer pin chamber 151, and requires a set amount of pull for forceable removal from outer pin chamber 151, approximately the amount of pull which can be exerted by a one-pound fish.

Although the invention has been described in conjunction with the foregoing specific embodiment, many alternatives, variations and modifications are apparent to those of ordinary skill in the art. Those alternatives, variations and modifications are intended to fall within the spirit and scope of the appended claims.

We claim:

1. A signalling apparatus for indicating when a bait has been taken by a fish comprising:
   means for activating a signal;
   a means for continuous signalling, said means for activating said signalling means comprising a power source communicating with said signal;
   said power source including a battery, and
   said signalling means comprising a light bulb connected to said power source through a switching means;
   said switching means comprising a removable plug and socket for completing the circuit between the bulb and the power source when said plug is removed from said socket; and
   said signalling means, power source and switching means being enclosed within a casing with said removable plug projecting therefrom;
   said plug having means for operative connection to a first end of a fish line and having the second end of the fish line connected to a hook;
   said casing having means for securing said casing into the mouth of an empty vessel;
   said casing provided with means for preventing water from entering within said casing; and
   said removable plug provided with means for selectively choosing a weight of fish capable of activating said means for continuous signalling.

2. The signalling apparatus of claim 1 wherein said means for selectively choosing a weight of fish capable of activating said means for continuous signalling comprises concentric grooves formed within said plug, said concentric grooves having O-rings received thereon.

3. The signalling apparatus of claim 2 wherein the plug is removed from the socket by the pull of a fish on the fish line operatively connected to the plug.

4. The signalling apparatus of claim 3 adapted for connection to floating means.

5. A signalling apparatus for indicating when a bait has been taken by a fish comprising:
   means for activating a signal;
   a means for continuous signalling following a single activation, said means for activating said signalling means comprising a power source communicating with said signal;
   and
   said signalling means comprising a light bulb connected to said power source through a switching means;
   said switching means comprising a removable plug and socket for completing the circuit betweent he bulb and the power source when said plug is removed from said socket; and
   said signalling means, means, power source and switching means being enclosed within a casing with said removable plug projecting therefrom;
   said plug having means for operative connection to a first end of a fish line and having the second end of the fish line connected to a hook;
   said casing having means for securing said casing into the mouth of an empty vessel;
   said plug having means for selectively choosing a weight of fish capable of activating said signalling means.

* * * * *